United States Patent
Peeters et al.

(10) Patent No.: US 6,792,101 B2
(45) Date of Patent: Sep. 14, 2004

(54) METHOD TO TRANSPORT A REFERENCE CLOCK SIGNAL

(75) Inventors: Miguel Peeters, Brussels (BE); Jan Lieven Bert De Groote, Berchem (BE)

(73) Assignee: Alcatel, Paris (FR)

( * ) Notice: Subject to any disclaimer, the term of this patent is extended or adjusted under 35 U.S.C. 154(b) by 585 days.

(21) Appl. No.: 09/882,796

(22) Filed: Jun. 15, 2001

(65) Prior Publication Data

US 2002/0006190 A1 Jan. 17, 2002

(30) Foreign Application Priority Data

Jun. 16, 2000 (EP) ............................................ 00401717

(51) Int. Cl.$^7$ ................................................ H04M 3/00
(52) U.S. Cl. ...................................... 379/243; 370/354
(58) Field of Search .......................... 370/236.2, 241.1, 370/503, 516, 517, 518; 375/354, 356, 357, 371; 379/243

(56) References Cited

U.S. PATENT DOCUMENTS

| | | | |
|---|---|---|---|
| 4,337,463 A | 6/1982 | Vangen | 340/825.2 |
| 5,953,384 A | 9/1999 | Walsh et al. | 375/354 |
| 6,052,412 A * | 4/2000 | Ruether et al. | 375/231 |

FOREIGN PATENT DOCUMENTS

| | | |
|---|---|---|
| EP | 0 678 989 A2 | 10/1995 |
| WO | WO 99/00928 | 1/1999 |

\* cited by examiner

*Primary Examiner*—Ahmad F. Matar
*Assistant Examiner*—Quynh H. Nguyen
(74) *Attorney, Agent, or Firm*—Sughrue Mion, PLLC

(57) ABSTRACT

A method to transport a reference clock signal from a central office to a line terminal in a communication system. The central office retrieves a reference clock signal, and a first counter in the central office is synchronized with the reference clock signal. The counter values of the first counter are regularly transferred as part of physical layer operation and maintenance cells over the optical link. A counter value of a second counter of the carrier unit is adjusted when a counter value is received as part of a physical layer operation and maintenance cell. Clock signals are derived from the second counter for the line terminal. The first counter values are inserted into a group of predefined message fields of the physical layer operation and maintenance cell, and extracted therefrom to adjust the value of the second counter.

8 Claims, 1 Drawing Sheet

METHOD TO TRANSPORT A REFERENCE CLOCK SIGNAL

Figure 1:
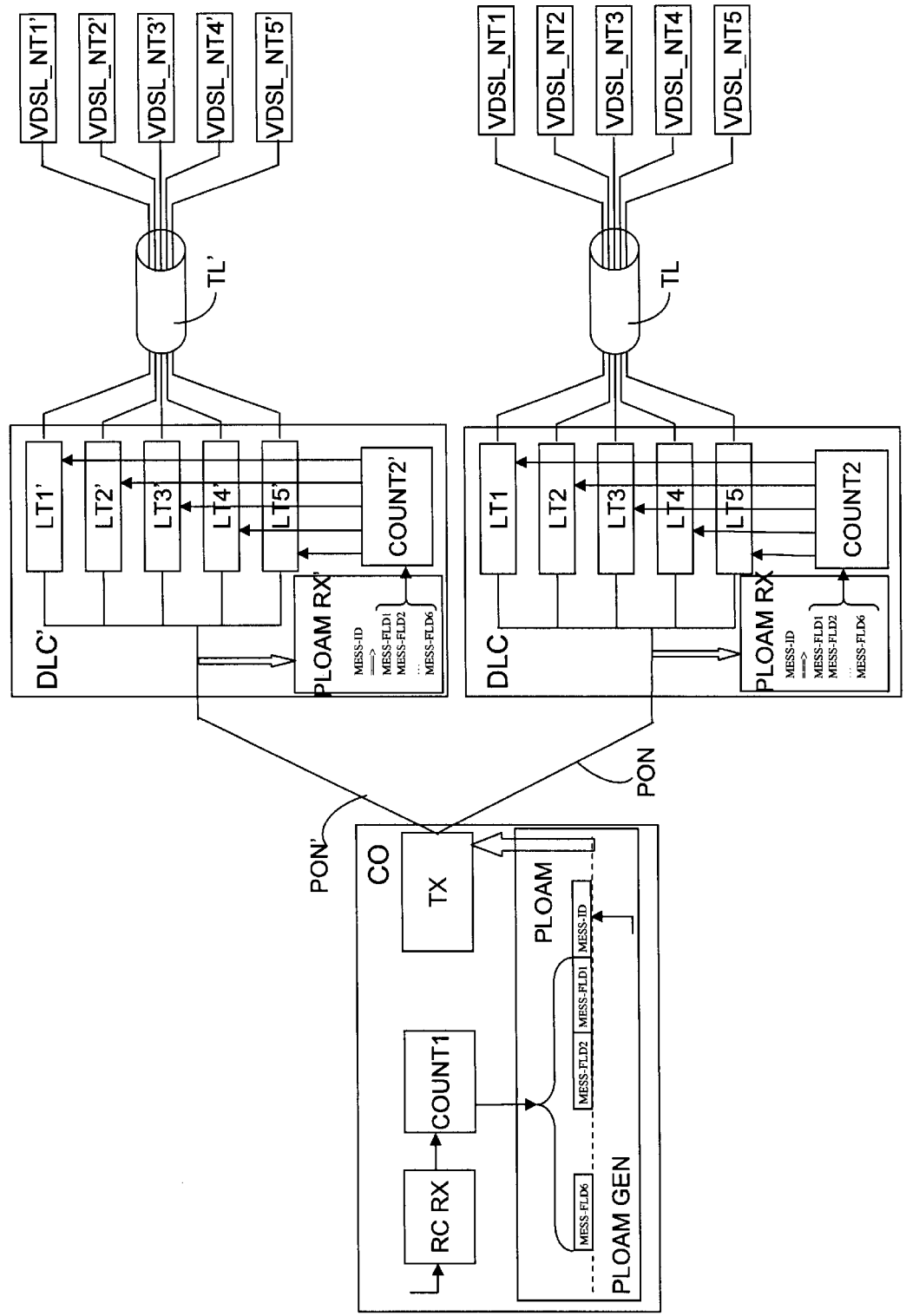

The present invention relates to a method to transport a reference clock as described in the preamble of claim 1, to a method to synchronize a plurality of line terminals and to a method to synchronize a first line terminal in a first carrier unit with a second line terminal in a second carrier unit using such above method, as described in the preamble of, respectively, claim 3 and claim 4, and to a central office and a carrier unit, realizing such a method as described in the preamble of claim 5 and claim 6, and to a telecommunication network comprising such a central office and such a carrier unit as described in the preamble of claim 7.

Such a method to transport a reference clock signal from a central office to a line terminal in a communication system wherein the central office communicates with the line terminal in a carrier unit via an optical link is already known in the art, e.g. from the *ITU-T Recommendation G.983.1* (10/98) with title '*Broadband optical access systems based on Passive Optical Networks (PON)*'. According to paragraph 8.3.5 'Transport specific TC functions' and more particular in paragraph 8.3.5.3 'Downstream PLOAM structure' whereof the sub-paragraph 8.3.5.3.4 'Synchronization field (SYNC1–SYNC2)' describes the purpose of the synchronization field SYNC1 and SYNC2 of the Physical layer Operation and Maintenance cell, shortly called hereafter PLOAM cell.

Such a physical layer operation and maintenance cell is a predefined part of one of the downstream information packets that is broadcasted on a predefined regular base from the central office to a plurality of line terminals in order to transport operation and maintenance information packets related to operation and maintenance functions.

Such functions are e.g.:

Performance monitoring;

Defect and failure detection;

System protection;

Failure or performance information;

Fault localization.

An optional Synchronization field of the PLOAM cell is described in the above-mentioned paragraph. The purpose of this field is to transport a 1 kHz reference signal provided at the optical line terminal OLT to the Optical Network Units ONU's.

It has to be remarked that the OLT and the ONU's are called hereafter and in the present claims, respectively, Central Office CO and Line Terminal LT.

As it is described in the Recommendation, a counter in the central office is incremented and reset on a regular base in order to generate a reference signal. At the central office, the value of that counter is taken right before transmission of the first PLOAM cell of a frame. The 15 least significant bits of the counter are placed in the 15 least significant bits of the SYNC1–SYNC2 field of the PLOAM cell. The most significant bit of the counter is placed in the most significant bit of the SYNC1 filed. Depending on the length of the counter other timing references can be obtained. At reception in the line terminal, this field is used to synchronize a local counter. The line terminal is then locked on the central office counter.

Thus a known method to transport a reference clock signal from a central office to a line terminal in e.g. a carrier unit via an optical link PON e.g. a PON system comprises the following steps:

a. retrieving the reference clock signal by the central office; and b. synchronizing a first counter into the central office with the reference clock signal; and c. regularly transferring counter values of the first counter as part of physical layer operation and maintenance cells over the optical link; and d. adjusting a counter value of a second counter of the carrier unit when a counter value is received as part of a the physical layer operation and maintenance cell; and e. deriving clock signals from the second counter for the line terminal.

A problem with this method is that the achieved accuracy is limited by two bytes i.e. the two predefined bytes SYNC1 and SYNC2 of each PLOAM cell in order to transport the reference clock. Indeed the number of bits that are representing the counter values of the first counter which are regularly transported are limited by the two predefined synchronization fields SYNC1 and SYNC2.

An object of the present invention is to provide a method to transport a reference clock signal from a central office to a line terminal in a communication system according to the above known method but wherein an improved accuracy is reached.

According to the invention, this object is achieved with the method to transport a reference clock according to claim 1, and with the method to synchronize a plurality of line terminals in a communication system and with the method to synchronize a first line terminal in a first carrier unit with a second line terminal in a second carrier unit that comprises such a method, according to, respectively, claim 3 and claim 4, and with the central office and the carrier unit that realizes such a method according to, respectively, claim 5 and claim 6, and with the telecommunication method according to claim 7, that comprises such a central office and such a carrier unit.

Indeed, by realizing the above mentioned step c) by means of assigning a predefined value to a predefined message identifier filed of the physical layer operation and maintenance cell and by comprising the counter values of the first counter in a plurality of predefined message fields of the physical layer operation and maintenance cell and by realizing the above mentioned step d) by means of recognizing the predefined value of the predefined message identifier field and by, upon recognition, extracting the counter value from the plurality of predefined message fields, a counter value represented by a bigger number as two bytes can be transported from the central office to the line terminal.

It has to be explained that the above mentioned Recommendation G.983.1 defines in paragraph 8.3.5.3.7 messages in the PLOAM cells to transport e.g. all Operation and Maintenance related alarms or threshold-crossing. Also all ranging related messages are mapped in the message field of the PLOAM cell. The format of the PLOAM message is indicated in Table 11/G.983.1. Herein it is shown that a message identifier field indicates the type of message and a number of message fields are containing the message. Furthermore, it is shown in Table 17 of this Recommendation, which defines the messages, that message number 20 with message name 'Vendor specific message' describes a number of values for the message identifier field of the physical layer and operation cell, that are reserved for vendor specific messages from the central office to the line terminal. By assigning one of these vendor specific values to this predefined message identifier field it is allowed to comprise a vendor specific message in the message fields.

According to the present invention the central office and the respective carrier units are instructed to associate the presence of a vendor specific value for the message identifier field with the transport of first counter value into a plurality of these message fields for synchronization purposes. Since the PLOAM cell contains up to 10 message fields an improved accuracy is realized with counter values of the first counter being represented by at least two bytes and by comprising these counter values in at least two of the predefined message fields.

Furthermore, when a counter value is received as part of physical layer and operation and maintenance cell by a carrier unit, the above mentioned step d) is realized i.e. adjusting a counter value of a second counter, by recognizing the predefined vendor specific value in the predefined message identifier field and by extracting the accurate counter value from the plurality of predefined message fields.

The method of the invention can be used to synchronize a plurality of line terminals in a communication system wherein a central office communicates with the plurality of line terminals in a carrier unit via an optical line. Indeed, the method comprises the step of transporting a reference clock signal according to the method of the present invention from the central office to each one of this plurality of line terminals. Hereby comprises step e) deriving from the second counter clock signals for each one of the plurality of line terminals whereby the line terminals are synchronize to each other. This is described in claim 3.

Another use of the present invention is realized by a method to synchronize a first line terminal in a first carrier unit with a second line terminal in a second carrier unit, in a communication system wherein a central office communicates with the first line terminal and with the second line terminal via, respectively, a first optical line and a second optical link.

Such a method is known in the art e.g. from the International Application published under the Patent Cooperation Treaty PCT at Jan. 7, 1999, with International Publication Number WO 99/00928 and with the title 'Arrangement for synchronization of nodes in VDSL Systems'. Therein an arrangement for synchronization of nodes in VDSL—systems, or more exactly, synchronization of optical nodes which share a common part of a cable in the access network between the subscribers and the local station are described. A time-synchronization towards an external system, for instance GPS, which gives a time reference by which the different nodes can be synchronized is provided. The synchronization reduces the near cross talk between the VDSL-system in the different nodes. Preferably respective node includes a receiver for a synchronization signal and an internal oscillator with high stability to deliver a stable clock signal.

This above known method to synchronize the first line terminal in the first carrier unit with the second terminal in the second carrier unit describes a step of synchronizing the first line terminal and the second line terminal to a common reference clock signal. By using the method of transporting a reference clock signal from the central office to the first line terminal according to the present invention and by using also the method of transporting a reference clock signal from the central office to the second line terminal according to the present invention and by constituting the reference signal each time with the common reference clock, both line terminals are synchronized to each other in a very accurate way. This is described in claim 4.

A preferred implementation of step a) of the method according to the present invention is described in claim 2.

Indeed, by receiving during this step a) a universal clock signal and by constituting the reference clock with this universal clock signal a high clock accuracy is achieved.

It has to be remarked that the method according to the present invention achieves high clock accuracy in all parts of the network by distribution of clock reference signals rather than by implementing a high accuracy free running clock at each node. This synchronization is done hierarchically with a unique clock source of the hierarchy i.e. the Primary Reference Clock. A physical realization of a Primary Reference clock can be a cesium clock that has a frequency accuracy of some times $10^{-13}$. It can also be realized by a disciplined rhubidium controlled by a General Position System or a similar system.

It should further be noticed that the term "including", used in the claims, should not be interpreted as being limitative to the means listed thereafter. Thus, the scope of the expression "a device including means A and B" should not be limited to devices consisting only of components A and B. It means that with respect to the present invention, the only relevant components of the device are A and B.

Similarly, it is to be noted that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawing wherein the FIGURE represents a communication system.

The working of the central office CO and the respective carrier units DLC and DLC' in accordance with the network terminals shown in the figure will be explained by means of a functional description of the different blocks as shown therein. Based on this description, the practical implementation of the blocks will be obvious for a person skilled in the art and will therefor not be described in details. In addition, the principle working of the method to transport a reference clock from the central office CO to the line terminals will be described in further details by means of a principle example.

Referring to the FIGURE a communication system is shown. In the communication system a passive optical system is coupled via two branches PON and PON' to a Very high speed Digital Subscriber Line System—VDSL system. Several network terminals VDSL_NT1, VDSL_NT2, VDSL_NT3, VDSL_NT4, VDSL_NT5 and VDSL_NT1', VDSL_NT2', VDSL_NT3', VDSL_NT4', VDSL_NT5' are bi-directionally communicating with the central office CO. The communication network consists of two passive optical links PON and PON' between the central office CO and, respectively, a first plurality of line terminals LT1, LT2, LT3, LT4, LT5 in a first digital carrier unit DLC and a second plurality of line terminals LT1',LT2',LT3',LT4', LT5' in a second digital carrier unit DLC'; and a plurality of copper lines respectively interconnecting the first plurality of line terminals LT1, LT2, LT3, LT4, LT5 with corresponding network terminals VDSL_NT1, VDSL_NT2, VDSL_NT3, VDSL_NT4, VDSL_NT5 and interconnecting the second plurality of line terminals LT1', LT2', LT3', LT4', LT5' with corresponding network terminals VDSL_NT1', VDSL_NT2', VDSL_NT3', VDSL_NT4', VDSL_NT5'. Bi-directional communication between the line terminals and network terminals is realized in a time domain duplexed way. To avoid cross-talk between downstream transmission over a first copper line and upstream transmission over a second copper line in the same cable TL or TL', it is important to synchronize all line terminals and all network terminals so that downstream transmission occurs simultaneously over all copper lines within one cable TL or TL' and that also upstream transmission occurs simultaneously over all copper lines within one cable TL or TL'. The importance of the synchronization of the downstream transmission and the upstream transmission is also described in the above-mentioned PCT application.

The central office CO comprises a retriever GPS-RX, a synchronizer COUNT1, a physical layer operation and maintenance cells generator PLOAM-GEN, shortly called hereafter a PLOAM generator PLOAM-GEN, and a transmitter TX. The retriever GPS-RX is coupled to the synchronizer COUNT1 that on its turn is coupled to the PLOAM generator PLOAM-GEN. The PLOAM generator is coupled to the transmitter TX.

The transmitter TX is coupled via the PON to the first carrier unit DLC and via the PON' to the second carrier unit DLC'. The first carrier unit DLC and the second carrier unit DLC' are each comprising a PLOAM receiver, respectively, PLOAM-RX and PLOAM-RX', a second synchronizer COUNT2 and COUNT2', and the above-mentioned plurality of line terminals LT1, LT2, LT3, LT4, LT5 and LT1', LT2', LT3', LT4', LT5'.

The first carrier unit DLC and the second carrier unit DLC' are each coupled to a plurality of VDSL network terminals, respectively, VDSL_NT1, VDSL_NT2, VDSL_NT3, VDSL_NT4, VDSL_NT5 and VDSL_NT1', VDSL_NT2', VDSL NT3', VDSL NT4', VDSL_NT5', via copper lines within one cable TL coupled to the first carrier unit DLC and TL' coupled to the second carrier unit DLC'.

The retriever GPS-RX of the central office CO is included to retrieve a reference clock signal. In a preferred embodiment the reference clock signal is constituted by a universal clock signal GPS. Such a universal clock signal is explained in a paragraph above. This reference clock signal is provided to the first synchronizer COUNT1. The first synchronizer COUNT1 synchronizes a first counter to the provided reference clock signal. Furthermore the first synchronizer COUNT' provides counter values of this first counter to the PLOAM generator PLOAM-GEN. The PLOAM generator is able to generate on a regular base PLOAM cells and to comprise therein a counter value of the first counter and to provide the PLOAM cell to the transmitter TX. This means that these PLOAM cells are provided to the transmitter TX that inserts, on the downstream link from the central office CO to the first carrier unit DLC and the second carrier unit DLC', a PLOAM cell at regular fixed positions in this downstream frame.

In this way, the central office CO is able to insert a message into this PLOAM cell. The moment this downstream PLOAM message is generated and transmitted, a snapshot of the counter is taken and put in the message of this PLOAM cell. How the snapshot of the counter is transported in the PLOAM cell will now be explained.

The PLOAM cell generator is further enabled to assign a predefined value to a predefined message identifier field MESS-ID of this PLOAM cell and to comprise the counter value of the first counter in a number of predefined message fields MESS-FLD1, MESS-FLD2, ..., MESS-FLD6, ... of this PLOAM cell. As explained in the introductory part, the predefined value for the message identifier field MESS-ID is a value that is not used for the pre-defined messages in the above-mentioned standard. In this standard, such a free available value is called a vendor specific value. Such a vendor specific value is used according to the present application for the transport of the snapshot of the first counter value. In the event when this vendor specific value is used, the value of the first counter is inserted in the message fields MESS-FLD1, MESS-FLD2, ..., MESS-FLD6, ... that are associated to this message identifier field MESS-ID.

The PLOAM cells are distributed to the respective digital carrier units DLC and DLC' and are received there by a PLOAM receiver PLOAM-RX. The PLOAM receiver PLOAM-RX extracts from the PLOAM-cell values of the first counter. These counter values are provided to a second synchronizer COUNT2 and COUNT2' that adjusts a counter value of a second counter according to the received counter values and that derives clock signals from this second counter for the present line terminals LT1, LT2, LT3, LT4, LT5 and LT1', LT2', LT3', LT4', LT5'. How the respective PLOAM receiver PLOAM-RX or PLOAM-RX' extracts the first counter values from the PLOAM cells will now be explained in the following paragraph.

The respective PLOAM receiver PLOAM-RX and PLOAM-RX' is further comprised in the carrier unit to recognize a predefined value in a predefined message identifier field MESS_ID. This predefined value is this vendor specific value. In the event when the vendor specific value is recognized, the PLOAM receiver e.g. PLOAM-RX knows that the forwarded counter values are comprised in predefined message fields MESS-FLD1, MESS-FLD2, ..., MESS-FLD6, ... of the PLOAM cell that are associated to this predefined message identifier field MESS-ID. In this way the first counter values are extracted from these message fields MESS-FLD1, MESS-FLD2, ..., MESS-FLD6, ... and not e.g. according to the above-mentioned prior art implementation from the synchronization fields SYNC1-SYNC2.

It has to be mentioned that in the Recommendation G.831.1 there are ten message fields predefined. In the event when all these 10 fields are used to transport a first counter value, the first counter value can be represented with 5 times more bytes compared to the prior art used two synchronization fields SYN1 and SYNC2.

In this way the number of used message fields out of the available maximum of ten message fields can be defined in line with the desired accuracy. Herewith it is clear that according to a used predefined vendor specific value for the message identifier field the number of used predefined message fields might be different. Indeed, according to the desired accuracy a specific value is entered in the message identifier field MESS-ID whereby the snapshot of the first counter i.e. a value of the first counter is entered in a predefined number of message fields being associated to this specific value in the message identifier field. Even more, according to a predefined installed association in the central office CO and in the respective carrier units DLC and DLC', the first counter value doesn't need to be inserted in the consecutive available message fields e.g. MESS-FLD1, MESS-FLD2, ... but might be as well be entered in some pre-identified message fields e.g. MESS-FLD6 and MESS-FLD2.

With the example that will be described now, the principle working of the present invention will become more clear.

The retriever GPS-RX retrieves a universal clock signal GPS and provides this to the first synchronizer COUNT1. The first synchronizer COUNT1 synchronizes a first counter with this universal clock signal GPS. On a regular base snap-shots from the first counter i.e. first counter values are provided to the PLOAM generator PLOAM-GEN. The PLOAM generator generates on a regular base PLOAM cells and comprises therein the first counter values. As it is preferred to use the method according to the invention the PLOAM generator assigns a predefined value i.e. a vendor specific value to a predefined message identifier field MESS-ID of the PLOAM cell and comprises thereby the first counter value in the first six predefined messages fields MESS-FLD1, MESS-FLD2, MESS-FLD3, MESS-FLD4, MESS-FLD5 and MESS-FLD6 of the 10 available message fields. The PLOAM cell is provided to the transmitter TX from the central office CO. The transmitter TX transmits the PLOAM cell at regular fixed positions in the downstream frame that is distributed via both optical links PON and PON' to two carrier units DLC and DLC'.

Each receiver PLOAM-RX and PLOAM-RX' receives the data in the downstream frame and therewith also on a regular base the PLOAM cells.

The receivers PLOAM-RX and PLOAM-RX' investigates the value of the message identifier field MESS-ID. Upon recognition of the vendor specific value the receivers are instructed to extract the counter values for synchronization purposes of the line terminals from the first six predefined messages fields MESS-FLD1, MESS-FLD2, . . . , MESS-FLD6 of the 10 available message fields. These counter values are provided by the PLOAM receivers PLOAM-RX and PLOAM-RX' to both second synchronizers COUNT2 and COUNT2'. Each second synchronizer COUNT2 and COUNT2 adjusts a counter value of a second counter according to these received values. Furthermore, the second synchronizers COUNT2 and COUNT2 are deriving a clock signal from the second counter and are providing this clock signal to the respective line terminals LT1, LT2, LT3, LT4, LT5 and LT1', LT2', LT3', LT4', LT5'. In this way a reference clock signal is transported from the central station CO to the line terminals LT1, LT2, LT3, LT4, LT5 and LT1', LT2', LT3', LT4', LT5'; whereby the line terminals LT1, LT2, LT3, LT4 and LT5 within the carrier unit DLC are synchronized to each other and also the line terminals LT1', LT2', LT3', LT4', LT5' within the carrier unit DLC' are synchronized to each other; but furthermore also a line terminal e.g. LT1 of the first carrier unit DLC is synchronized with a line terminal e.g. LT3' of the second carrier unit DLC4 are synchronized to each other.

While the principles of the invention have been described above in connection with specific apparatus, it is to be clearly understood that this description is made only by way of example and not as a limitation on the scope of the invention, as defined in the appended claims.

What is claimed is:

1. A method to transport a reference clock signal from a central office to a line terminal in a communication system wherein said central office communicates with said line terminal in a carrier unit via an optical link, said method comprises:

a. retrieving said reference clock signal by said central office;

b. synchronizing a first counter into said central office with said reference clock signal;

c. regularly transferring counter values of said first counter as part of physical layer operation and maintenance cells over said optical link;

d. adjusting a counter value of a second counter of said carrier unit when a counter value is received as part of said physical layer operation and maintenance cell;

e. deriving clock signals from said second counter for said line terminal, wherein said method further comprises in order to realize said step c) assigning a predefined value to a predefined message identifier field of said physical layer operation and maintenance cell and comprising said counter values of said first counter in a plurality of predefined message fields of said physical layer operation and maintenance cell and being associated to said predefined message identifier field, and in order to realize said step d) recognizing said predefined value of said predefined message identifier field, and upon recognition, extracting said counter value from said plurality of predefined message fields.

2. The method according to claim 1, wherein receiving during said step a) a universal clock signal and constituting said reference clock signal with said universal clock signal.

3. A method to synchronize a plurality of line terminals in a communication system wherein a central office communicates with said plurality of line terminals in a carrier unit via an optical link, wherein said method comprises transporting a reference clock signal from said central office to each one of said plurality of line terminals according to claim 1, whereby said step e) comprises deriving from said second counter, clock signals for each one of said plurality of line terminals.

4. A method to synchronize a first line terminal in a first carrier unit with a second line terminal in a second carrier unit, in a communication system wherein a central office communicates with said first line terminal and with said second line terminal via, respectively, a first optical link and a second optical link, said method comprises synchronizing said first line terminal and said second line terminals to a common reference clock signal, wherein said method comprises transporting a reference clock signal from said central office to said first line terminal and transporting said reference clock signal from said central office to said second line terminal according to claim 1 and constituting said reference clock signal with said common reference clock signal.

5. A central office to transmit a reference clock signal to a line terminal in a communication system wherein said central office communicates with said line terminal in a carrier unit via an optical link, said central office comprises:

a retrieving means to retrieve a reference clock signal and to provide said reference clock to a first synchronizing means coupled thereto; and said first synchronizing means to synchronize a first counter with said reference clock signal and to provide thereby counter values of said first counter to a physical layer operation and maintenance cells generating means coupled thereto; and said physical layer operation and maintenance cells generating means to generate regularly a physical layer operation and maintenance cell and to comprise therein a counter value of said first counter and to provide said physical layer operation and maintenance cell to a transmitting means coupled thereto; and said transmitting means to transmit regularly a physical layer operation and maintenance cell over said optical link in order to thereby enable said carrier unit to adjust a counter value of a second counter when a counter value is received as part of a said physical layer operation and maintenance cell and to derive from said second counter clock signals for said line terminal, wherein said physical layer operation and maintenance cells generating means of said central office is further comprised to assign a predefined value to a predefined message identifier field of said physical layer operation and maintenance cell and to comprise said counter values of said first counter in a plurality of predefined message fields of said physical layer operation and maintenance cell and being associated to said message identifier field.

6. A carrier unit that comprises a line terminal to communicate with a central office in a communication system via an optical link and to receive thereby a reference clock signal being retrieved by said central office, said carrier unit comprises a physical layer operation and maintenance receiver to receive physical layer operation and maintenance cells being regularly transferred over said optical link by said central office, and to extract from said physical layer operation and maintenance cell values of a first counter having been synchronized into said central office with said reference clock signal, and to provide said counter values to a second synchronizing means coupled thereto; and said second synchronizing means adjusts a counter value of a second counter according to said counter values and to derive clock signals from said second counter for said line terminal, wherein said physical layer operation and maintenance receiver is further comprised in said carrier unit to recognize a predefined value of a predefined message identifier field being assigned thereto by said central office, and upon said recognition to extract a said counter value from a plurality of predefined messages fields of said physical layer operation and maintenance cell, said plurality of predefined message fields being associated to said predefined message identifier field.

7. A telecommunication network, wherein said telecommunication network comprises a central office according to claim 5.

8. A telecommunication network, wherein said telecommunication network comprises a carrier unit according to claim 6.

* * * * *